United States Patent
Kleihorst et al.

(10) Patent No.: US 7,904,698 B2
(45) Date of Patent: Mar. 8, 2011

(54) ELECTRONIC PARALLEL PROCESSING CIRCUIT FOR PERFORMING JUMP INSTRUCTIONS

(75) Inventors: Richard P. Kleihorst, Neerpelt (BE);
Anteneh A. Abbo, Eindhoven (NL);
Sebastien F. Mouy, Gondecourt (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 412 days.

(21) Appl. No.: 11/815,876

(22) PCT Filed: Feb. 9, 2006

(86) PCT No.: PCT/IB2006/050422
§ 371 (c)(1),
(2), (4) Date: Aug. 9, 2007

(87) PCT Pub. No.: WO2006/085277
PCT Pub. Date: Aug. 17, 2006

(65) Prior Publication Data
US 2008/0189515 A1    Aug. 7, 2008

(30) Foreign Application Priority Data
Feb. 14, 2005 (EP) ..................... 05101051

(51) Int. Cl.
*G06F 7/38* (2006.01)
*G06F 9/00* (2006.01)
*G06F 9/44* (2006.01)
(52) U.S. Cl. ........................ 712/221; 712/236
(58) Field of Classification Search .......... 712/221, 712/236
See application file for complete search history.

(56) References Cited

U.S. PATENT DOCUMENTS

| | | | |
|---|---|---|---|
| 5,867,723 A * | 2/1999 | Chin et al. | 712/11 |
| 5,923,862 A | 7/1999 | Nguyen et al. | |
| 2002/0083311 A1* | 6/2002 | Paver | 712/236 |
| 2004/0054871 A1 | 3/2004 | Pechanek et al. | |
| 2004/0181652 A1 | 9/2004 | Ahmed et al. | |

FOREIGN PATENT DOCUMENTS

| | | |
|---|---|---|
| EP | 0035647 A2 | 9/1981 |
| EP | 0682309 A2 | 11/1995 |
| EP | 1267256 A2 | 12/2002 |
| JP | 1153189 A | 6/1989 |
| JP | 04096133 A | 3/1992 |
| WO | WO0045282 A1 | 8/2000 |

OTHER PUBLICATIONS

Govindaraju et al., Fast Computation of Database Operations using Graphics Processors, Jun. 2004.*

* cited by examiner

*Primary Examiner* — Alford W Kindred
*Assistant Examiner* — Jesse R Moll
(74) *Attorney, Agent, or Firm* — Larry Liberchuk

(57) ABSTRACT

The electronic circuit contains a plurality of processing elements (10), which are supplied with instructions under control of a common program flow, typically for SIMD operation wherein the same instructions are applied to all processing elements and different operand data of the instructions to respective ones of the processing elements (10). Under control of the instructions each processing element (10) determines, whether an operand data dependent condition has occurred. The processing element outputs a condition signal dependent on said determination. The condition signals are summed to form a sum signal. Program flow is controlled by a conditional jump dependent on a value represented by the sum signal.

10 Claims, 1 Drawing Sheet

Figure 1:
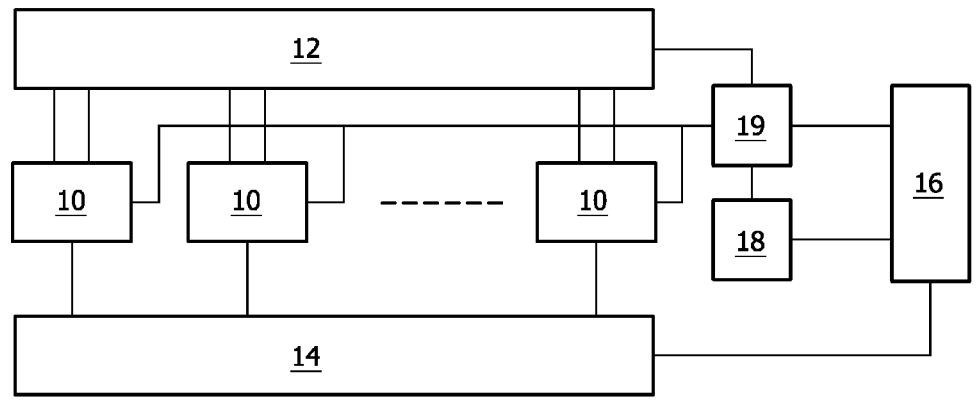

ELECTRONIC PARALLEL PROCESSING CIRCUIT FOR PERFORMING JUMP INSTRUCTIONS

The invention relates to an electronic circuit that comprises a plurality of parallel instruction processing elements.

A typical example of a processor circuit with a plurality of parallel instruction processing elements is a SIMD (Single Instruction Multiple Data) processor, wherein all processing elements perform common instruction cycles. In each instruction cycle the SIMD processing elements execute the same instruction of a program, each using their own operand data. Typically, such a SIMD processor has a central program counter, which is used to address instructions that are supplied to all processing elements in common.

In computer programs generally all but the very simplest programs involve some form of conditional flow control in order to jump from one part of the program to another, if some condition on a value of processed data is met, for example to implement if-then-else constructs from high level programs. Such jumps are implemented as conditional updates of the program counter.

It is desirable to implement conditional execution also in SIMD processors. Various approaches have been used. European Patent application No. 0035647 describes a construction wherein each processing element decides whether or not it will execute an instruction that is supplied in common to all processing element. An alternative solution is to use jumps that affect the selection of subsequent instructions for all processing elements collectively. It has been known to use jump conditions for such jumps that involve detection whether all processing elements signal that they have detected a certain condition, or whether no processing element signals that it has detected a certain condition. Typically, this is implemented using an OR circuit or an AND circuit with inputs coupled to flag inputs of the processing elements, the output of this OR/AND circuit being used to control whether or not a jump is executed.

It has also been known to mask flag signals from selectable processing elements, which allows for more varied conditions.

This type of conditional jumps affords only very limited data dependent control over program flow. A jump is only possible on conditions like “has none of the processing elements set their flag” or “have all of the processing elements set their flag”. This is of little use for example when (the data contains noise and) jumps dependent on statistical conditions are required.

Among others, it is an object of the invention to make it possible to perform jump instructions on more complex conditions in a processor circuit wherein a plurality of processing elements execute a program with common program flow.

Among others, it is an object of the invention to provide a processor circuit with a plurality of parallel processing elements that supports collective program jumps on statistical conditions.

An electronic circuit according to the invention is set forth in claim 1. According to the invention an adder circuit is used, with inputs connected to flag outputs of the processing elements and a sum output coupled to a common flow control circuit. In this way, program jump conditions can be based a count of the number of processing elements that have set their flags.

These and other objects and advantageous aspects of the invention will be illustrated by means of non-limitative examples using the following figures.

FIG. 1 shows a processing circuit

FIG. 2 shows a further processing circuit

FIG. 1 shows a processing circuit comprising a plurality of processing elements 10, an operand storage circuit 12, an adder circuit 14, a control processor 16, a program counter 18 and an instruction supply circuit 19. Although only three processing elements 10 are shown, it should be understood that in practice a much larger number may be present. Processing elements 10 have operand inputs and result outputs coupled to operand storage circuit 12 and flag outputs coupled to inputs of adder circuit 14. A sum output of adder circuit 14 is coupled to control processor 16. Instruction supply circuit 19 has an input coupled to program counter 18 and outputs coupled to processing elements 10, operand storage circuit 12 and control processor 16. Control processor 16 has a control output coupled program counter 18. In a simple implementation instruction supply circuit 19 is an instruction memory, which returns the content of memory locations addressed by program counter 18, but more complicated circuits may be used, which implement for example some form of caching, pipelining and/or preliminary instruction decoding. Organizationally program counter 18 can be considered to be part of instruction supply circuit 19, but it has been shown separately for the sake of clarity.

In operation program counter 18 supplies instruction addresses to instruction supply circuit 19. Under normal circumstances, program counter 18 increments the instruction address in successive instruction cycles, so that successive instructions of a program are addressed in the successive instruction cycles. In response to each instruction address, instruction supply circuit 19 supplies instruction information to processing elements 10, operand storage circuit 12 and control processor 16. In response to the instruction information operand storage circuit 12 outputs operand data to processing elements 10 and processing elements 10 execute instruction-controlled operations, each using a different part of the operand data as operand. As a result of the execution processing elements 10 each produce a result and the combined results of the processing elements 10 are written back to operand storage circuit 12 at an address that is controlled by the instruction from instruction supply circuit 19. In response to at least one type of instruction, processing elements 10 output operand dependent flag data at their flag outputs. In one example the processing elements 10 support a “compare” instruction and upon execution of this instruction each processing element 10 outputs a comparison result obtained for its particular operand at its flag output. In another example the signals at the flag outputs are produced as side effect during the computation of results, and indicate for example whether the result represents a number larger than zero, or represents an overflow etc.

Adder circuit 14 adds the signals at the flag outputs. That is, it forms a count of the number of the flag outputs at which a flag signal has a predetermined logic level. Thus, if only one of the processing elements outputs such a flag signal, adder circuit 14 outputs a signal representing the number “1”, if only two of the processing elements output such a flag signal adder circuit 14 outputs a signal representing the number “2”, etcetera up to “N” the number of processing elements.

Control processor 16 receives its own program counter dependent instructions from instruction supply circuit 19 and a sum signal from adder circuit 14. In response to these instructions control processor 16 may perform various types of actions. The instructions include conditional jump instructions (which term is used exchangeably with the term branch instructions herein). In response to an instruction of this type control processor 16 tests whether a condition is met that is specified in the instruction, and if so control processor 16 sends a signal to program counter 18 to change the instruction address. The required change may be an absolute change (to a program selected address) for example, or a relative change (to the old instruction address plus a program selected offset) as another example.

In an embodiment control processor 16 is designed to respond to at least one type of instruction by using a condition that depends on the sum signal from adder circuit 14. In one embodiment instructions of this type specify the condition in terms of a threshold number, so that control processor 16 causes program counter 18 to update the instruction address according to a relative or absolute jump in response to this instruction if the sum signal from adder circuit exceeds this threshold number (and/or optionally equals this number). In another embodiment control processor 16 causes the jump in response to this instruction if the sum signal from adder circuit is lower than or equals this threshold number. Preferably, control processor 16 is designed to support respective instructions to cause the jump if the sum signal from adder circuit is lower than (and or equals) and higher than (and/or equals) this threshold number respectively.

In an example this type of instruction is used to make statistical decisions during signal processing (such as processing of audio signals, wherein processing elements 10 process respective audio samples, or respective Fourier coefficients for example, and/or for processing video signals wherein processing elements 10 process respective pixel samples, or respective Fourier coefficients (as used herein "samples" refer not only to directly measured physical values, but also to series that result from processing of such measured series)). In a program for this type of tasks a normal program flow may be provided for example as well as special program parts for the case that more than a minimum of sample values exceed a threshold. In this case, the program may contain an instruction to jump to the special program part once, say, 5 percent of processing elements 10 detects that its operand value exceeds the threshold.

In a further embodiment, the circuit may be arranged to support masking of flags, so that adder circuit 14 will only form the sum of the flag signals from program selected ones of the processing elements 10. Masking can be implemented in various ways. In one embodiment, masking is supported in processing elements 10. In this case, for example each processing element 10 may be designed to respond to an instruction to output a zero flag signal (i.e. a signal that does not contribute to the sum) if a condition on a first operand of the instruction in the particular processing element 10 is not met and a control flag in a second operand of the instruction in the particular processing element 10 has a predetermined value. In this case the processing element 10 outputs a non-zero flag signal only if the condition is met and the control flag does not have the predetermined value.

In another embodiment masking is supported by means of a mask vector supplied by instruction supply circuit 19 to a control register (not shown). This mask vector may be supplied directly from instruction supply circuit 19, or via control processor 16.

Figure 2:
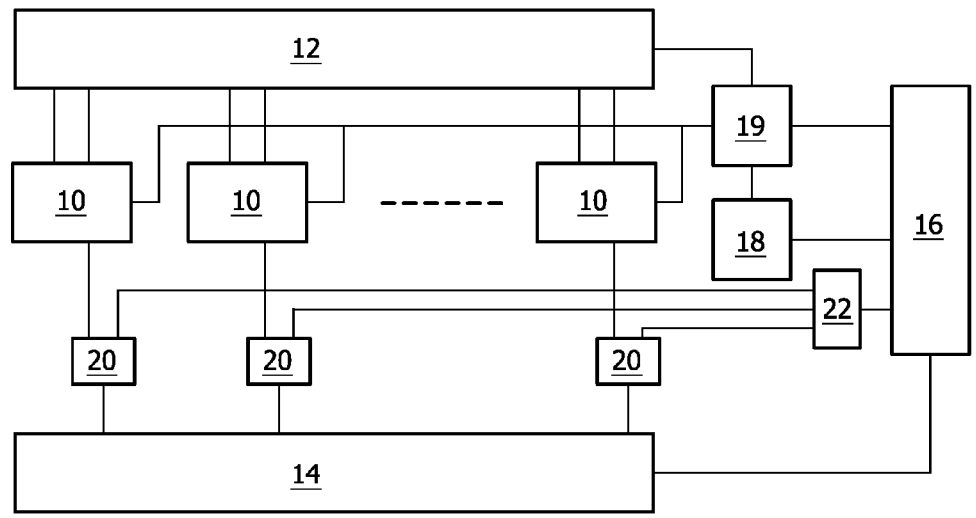

FIG. 2 shows an embodiment wherein that masking circuit is shown outside processing elements 10, in the form of AND gates 20 provided between processing elements 10 and adder circuit 14. The flag output of each processing element 10 is coupled to a first input of a respective AND gate, the control flag is supplied to a second input from a mask register 22. The outputs of AND gates 20 are coupled to adder circuits 14. In this embodiment control register 22 has respective outputs to inputs of AND gates 20 to provide control flags. In this embodiment the mask vector is supplied via control processor 16, which may be realized in the form of one or more instructions to set respective part of the control register. However, the invention is not limited to this embodiment for example a function similar to that of the AND gates may be internal to processing elements 10, in which case control register 22 is coupled to processing elements 10, or control registers may be used that are part of processing elements 10. Similarly, if the control flags are supplied from instruction supply circuit 19 this circuit will be coupled to control register 22, or if control flags come from operand storage circuit 12 control register 22 will be part of that circuit.

In another embodiment, processing elements 10 are constructed to output a plurality of different flag signals (signalling for example different conditions, such as operands are equal, first operand larger than second operand and first operand smaller than second operand, or operation result larger than zero, equal to zero and smaller than zero respectively). In this embodiment a plurality of adder circuits 14 may be provided between processing elements 10 and control processor 16, each for summing flag signals of a respective type. In this case, control processor 16 is preferably constructed to respond to different types of instructions that implement jumps in response to different types of sums. In another embodiment one adder circuit 14 is provided for a plurality of types of flag signals and multiplexers (not shown) are each coupled between a group of flag outputs from a respective processing element 10 and a corresponding input of adder circuit 14, control processor 16 having an output coupled to control inputs of these multiplexers for selecting the type of flag signal that must be summed under control of an instruction of control processor 16; alternatively processing elements may be arranged to select the type of flag under control of their instructions).

In one embodiment, adder circuit 14 is a saturating adder circuit, which is designed to sum only to a predetermined maximum value, returning a number representing that maximum, or a number modulo the real sum if the real sum exceeds the maximum value. This suffices in many cases. However, preferably adder circuit 14 is designed to add up to all possible sum values. Various types of adder circuit may be used. Preferably, a tree structured adder circuit 14 is used, wherein respective sub-adders (not shown) are provided to form respective partial sums of the flag signals from sub-sets of the processing elements, and one or more subsequent adders to sum the partial sums. This reduces the latency that is needed between generation of the flag signals and effectuation of the jump. In any case, it must be understood that some form of pipelining may be used, so that a sum of flag signals that processing elements 10 have output in one instruction cycle affects a jump that leads to a change in program counter address in a later instruction cycle, e.g. offset to the original instruction cycle by a number of cycles used in a pipe-lined adder circuit 14.

Preferably one bit flags are used. But in a further embodiment multi-bit flags may be used (for example two-bit flags, to indicate in which of four ranges a comparison between the operands of a processing element 10 results). In further embodiment, adder circuit 14 is designed to sum these multi-bit flags as numbers. It should be emphasized that the size of such multi-bit flags, if used, is preferably small, typically much smaller than the number of bits in the operands of processing elements 10, in order to avoid large latency between the output of the flags and execution of the jump.

Preferably the processing circuit is a SIMD (Single Instruction Multiple Data) circuit, which means that instruction supply circuit 19 supplies the same instruction to all processing elements 10 per instruction cycle. In this way it is ensured in a simple way that comparable flag signals will be output by processing elements 10, which can sensibly be summed. However, the invention is not limited to SIMD processors. The invention may also be applied to MIMD processors, i.e. processors wherein instruction supply circuit 19 is able to supply mutually different instructions to processing elements 10. Typically, in this case, jump instructions that are conditioned on the sum of the flag signals will only be used for flag outputs that are produced when equal or at least similar instructions are supplied to all processing elements 10 (or at least those processing elements 10 that are not masked out in the sum).

Furthermore, although the invention has been described for a preferred embodiment wherein the output of adder circuit 14 is used in the execution of conditional jump (or branch) instructions, it must be understood that in addition or alternatively the invention may be applied to interrupt or exception processing. In the case of an interrupt, control processor 16 causes a jump to a predetermined address when a condition occurs that depends on the sum. The condition and/or the predetermined address may be set in advance for subsequent instructions, for example permanently by hard-wiring or in response to an "enable interrupt" instruction. In this type of processor program counter 18 follows normal program flow unless the sum meets the condition after execution of any one instruction during normal program flow. If the condition is met control is transferred to exception processing instructions.

An embodiment has been described wherein control processor 16 is constructed to execute instructions in step with processing elements 10, including jump instructions for changing the program counter that controls instruction selection for both processing elements 10 and control processor 16. Typically, control processor 16 is constructed so that it can execute other types of instruction as well, for example in order to control capture of signal data into operand storage circuit 12 or updates of output of results from the circuit etc. However, it should be understood that the invention is not limited to this embodiment. In a different embodiment control processor 16 merely serves to monitor conditions and to implement program counter updates dependent on these conditions. In this case "instructions" for control processor merely contain jump target addresses (or offsets) and an optional specification of a condition, such as a threshold value of the sum and/or whether a jump is needed if the sum is above or below the threshold number.

Furthermore, although only the use of sums of the flag signals has been described in detail for specifying jump conditions, it should be understood that in addition control processor 16 may be construed to cause jumps on other conditions as well, for example dependent on whether some logic function of (optionally masked ones of the flag outputs is true). For this purpose corresponding logic circuits may be connected between the flag outputs and control processor 16 in parallel with adder circuit 14. In this case the instructions of control processor preferably specify which circuit should be used for deciding whether to implement a jump. However, it may be noted that for jumping on the result of some simple logic functions of the flag output signals, such as logic AND, logic OR and parity functions, the output signal of adder circuit 14 may be used: the logic OR is true if the sum is greater than zero, the logic AND is true if the sum equals the maximum possible value, and parity corresponds to the least significant bit of the sum.

In combination with masking of selected flag signals the output of the sum circuit may also be used to compute bits of error correction syndrome value. Typically, this involves a plurality of different masks and use of the least significant bit of the sums. Alternatively, a plurality of different sum circuits (some of which may have only a least significant bit output), and a plurality of mask registers may be provided in parallel to compute different bits of a syndrome in parallel.

The invention claimed is:

1. An electronic circuit comprising:
a plurality of parallel instruction processing elements, each having a flag output for supplying a condition signal that signals whether a data dependent condition has occurred during execution of an instruction by the processing element;
an instruction supply circuit with an output coupled to the processing elements;
an adder circuit with inputs and a sum output, the inputs being coupled to the flag outputs; and
a control circuit coupled to the instruction supply circuit to control program flow of supplied instructions, the control circuit having a condition input coupled to the sum output, the control circuit being arranged to effect a conditional program control jump of the instruction supply circuit dependent on a value of a sum supplied at the sum output.

2. The electronic circuit according to claim 1, comprising a masking circuit operative to suppress the dependence of the condition signals on the data dependent condition from mask selected ones of the processing elements.

3. The electronic circuit according to claim 1, programmed with a program that contains a jump instruction to force a program jump dependent on a value of the sum result relative to a number greater than one and less than a total number of the processing elements minus one.

4. The electronic circuit according to claim 1, wherein the electronic circuit has a SIMD architecture, the instruction supply circuit being arranged to supply the same instruction information in common to all processing elements.

5. The electronic circuit according to claim 1, wherein the control circuit is an instruction processing circuit, the instruction supply circuit being arranged to supply control instructions that are associated with respective instructions for the processing elements to the control circuit in synchronism with the supply of the instruction information to the processing elements, a control instruction set of the control circuit including a conditional jump instruction for effecting conditional program control jump.

6. The electronic circuit according to claim 1, wherein the condition signals that are added by the adder circuit are one bit signals, the sum being a multi-bit sum signal.

7. The electronic circuit according to claim 1, wherein an instruction set of the processing elements comprises a compare instruction that defines how the data dependent condition depends on operand data of the instruction.

8. The electronic circuit according to claim 1, wherein the control circuit is arranged to effect the conditional program control jump dependent on whether the value of the sum is below a threshold value specified in a control instruction of the control circuit or dependent on whether the value of the sum is above a threshold value specified in a control instruction of the control circuit.

9. A method of processing a plurality of operands in parallel, the method comprising:
supplying instructions to a plurality of parallel processing elements;
supplying respective operand data of the instructions to respective ones of the processing elements;
determining, in each particular processing element, whether an operand data dependent condition has occurred during execution of an instruction by that particular processing element;

outputting a condition signal from each particular processing element dependent on said determination;
summing the condition signals to form a sum signal; and
effecting a conditional program control jump in a program that contains the instructions, the jump being effected dependent on a value represented by the sum signal.

10. The method of claim 9, further comprising:
suppressing the dependence of the condition signals on the data dependent condition from mask selected ones of the processing elements.

* * * * *